US012319068B2

(12) United States Patent
Watanabe

(10) Patent No.: US 12,319,068 B2
(45) Date of Patent: Jun. 3, 2025

(54) LIQUID DISCHARGING HEAD AND LIQUID DISCHARGING APPARATUS

(71) Applicant: SEIKO EPSON CORPORATION, Tokyo (JP)

(72) Inventor: Eiichiro Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 18/355,267

(22) Filed: Jul. 19, 2023

(65) Prior Publication Data

US 2024/0025180 A1 Jan. 25, 2024

(30) Foreign Application Priority Data

Jul. 21, 2022 (JP) ................................ 2022-116599

(51) Int. Cl.
*B41J 2/175* (2006.01)

(52) U.S. Cl.
CPC ........ *B41J 2/17566* (2013.01); *B41J 2202/12* (2013.01)

(58) Field of Classification Search
CPC .... B41J 2/175; B41J 2/17566; B41J 2/14233; B41J 2002/14362; B41J 2002/14419; B41J 2202/12
See application file for complete search history.

(56) References Cited

U.S. PATENT DOCUMENTS

| | | | | |
|---|---|---|---|---|
| 11,104,134 | B2 * | 8/2021 | Mizuta | B41J 2/17509 |
| 11,260,661 | B2 * | 3/2022 | Watanabe | B41J 2/14201 |
| 11,951,740 | B2 * | 4/2024 | Tamai | B41J 2/14233 |

FOREIGN PATENT DOCUMENTS

JP 2020-199695 A 12/2020

* cited by examiner

*Primary Examiner* — An H Do
(74) *Attorney, Agent, or Firm* — WORKMAN NYDEGGER

(57) ABSTRACT a first flow path communicating with the first common flow path; a second flow path communicating with the first common flow path at a position different from a position at which the first flow path communicates with the first common flow path; a third flow path communicating with the second common flow path; and a fourth flow path communicating with the second common flow path at a position different from a position at which the third flow path communicates with the second common flow path. In a first mode: through the first flow path, a liquid is supplied to the first common flow path; through the second flow path, the liquid is collected from the first common flow path; through the third flow path, the liquid is supplied to the second common flow path; and through the fourth flow path, the liquid is collected from the second common flow path.

13 Claims, 10 Drawing Sheets

LIQUID DISCHARGING HEAD AND LIQUID DISCHARGING APPARATUS

The present application is based on, and claims priority from JP Application Serial Number 2022-116599, filed Jul. 21, 2022, the disclosure of which is hereby incorporated by reference herein in its entirety.

BACKGROUND

1. Technical Field

The present disclosure relates to a liquid discharging head and a liquid discharging apparatus.

2. Related Art

A liquid discharging apparatus such as an ink jet printer fills a liquid such as ink in a liquid discharging head and then discharges the liquid from the liquid discharging head. In a technology proposed for this type of liquid discharging head, a liquid is circulated in flow paths formed in the liquid discharging head to prevent a bubble from staying in the liquid and also to prevent the liquid from becoming more viscous. JP-A-2020-199695, for example, describes a technology related to a liquid discharging head that has: a plurality of individual flow paths corresponding to a plurality of nozzles; a common supply flow path communicating with one side of the plurality of individual flow paths in common; a common collection flow path communicating with another side of the plurality of individual flow paths in common; two supply ports through which the liquid is supplied to the common supply flow path; and two collection ports through which the liquid is collected from the common collection flow path. After the liquid is supplied from the two supply ports through the common supply flow path to the plurality of individual flow paths, the liquid is collected from the two collection ports through the common collection flow path.

In the technology in related art, however, the individual flow path has a higher flow path resistance than common flow paths such as the common supply flow path and common collection flow path, so there has been the risk that a bubble in a common flow path does not flow into an individual flow path but stays in the common flow path.

To address the above problem, a liquid discharging head of the present disclosure has: a plurality of individual flow paths corresponding to a plurality of nozzles; a first common flow path communicating with one side of the plurality of individual flow paths in common; a second common flow path communicating with another side of the plurality of individual flow paths in common; a first flow path communicating with the first common flow path; a second flow path communicating with the first common flow path at a position different from a position at which the first flow path communicates with the first common flow path; a third flow path communicating with the second common flow path; and a fourth flow path communicating with the second common flow path at a position different from a position at which the third flow path communicates with the second common flow path. In a first mode: through the first flow path, a liquid is supplied to the first common flow path; through the second flow path, the liquid is collected from the first common flow path; through the third flow path, the liquid is supplied to the second common flow path; and through the fourth flow path, the liquid is collected from the second common flow path.

A liquid discharging apparatus of the present disclosure has: the liquid discharging head described above; and a control device that controls the liquid discharging head in the first mode.

DESCRIPTION OF EXEMPLARY EMBODIMENTS

Figure 1:
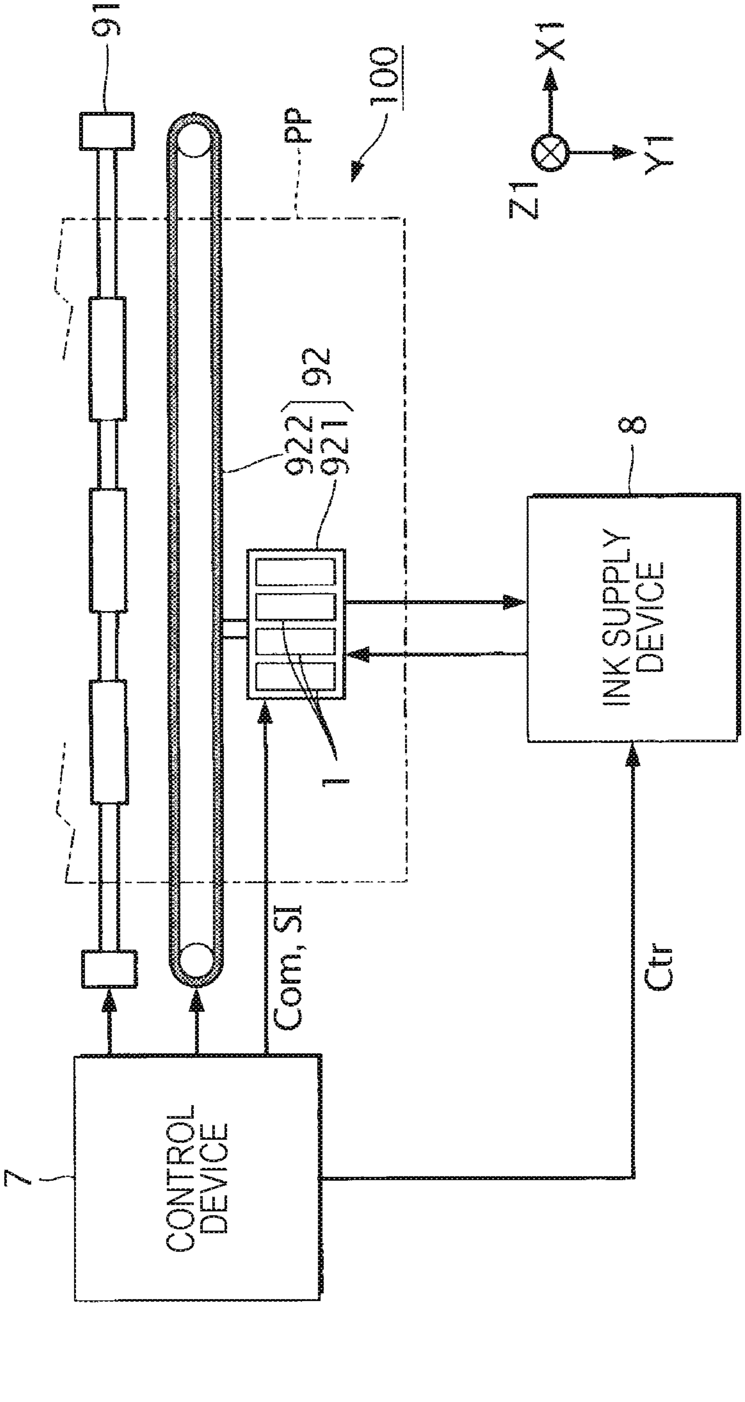
FIG. 1 illustrates an example of the structure of a liquid discharging apparatus according to an embodiment of the present disclosure.

An embodiment of the present disclosure will be described below with reference to the drawings. The dimensions and scales of individual sections and portions in the drawings differ from their actual dimensions and scales, as appropriate. Since the embodiment described below is a preferred specific example in the present disclosure, various limitations that are desirable from a technical viewpoint have been added. However, the scope of the present disclosure is not limited to these forms unless, in the explanation below, there is a particular description that limits the present disclosure.

A. Embodiment

A liquid discharging apparatus 100 according to this embodiment will be described below.

1. Overview of the Liquid Discharging Apparatus

FIG. 1 illustrates an example of the structure of the liquid discharging apparatus 100 according to this embodiment.

The liquid discharging apparatus 100 is an ink jet printing apparatus that discharges ink to a medium PP. The medium PP is typically a print sheet. However, a resin film, a fabric, and any other target eligible for printing can be used as the medium PP. Ink is an example of a liquid.

The liquid discharging apparatus 100 has a plurality of liquid discharging heads 1, a control device 7, an ink supply device 8, a movement mechanism 91, and a transport mechanism 92.

The control device 7 includes a processing circuit such as, for example, a central processing unit (CPU) or a field-programmable gate array (FPGA) and a storage circuit such as a semiconductor memory. The control device 7 controls elements in the liquid discharging apparatus 100.

The movement mechanism 91 transports the medium PP in the Y1 direction along the Y-axis under control of the control device 7. The Y1 direction along the Y-axis and the Y2 direction opposite to the Y1 direction will be collectively referred to below as the Y-axis direction. The X1 direction along the X-axis crossing the Y-axis and the X2 direction opposite to the X1 direction will be collectively referred to below as the X-axis direction. The Z1 direction along the Z-axis crossing the X-axis and Y-axis and the Z2 direction opposite to the Z1 direction will be collectively referred to below as the Z-axis direction. When the inner product of a vector starting from one object and terminating at another object and a vector oriented in the X1 direction is positive, this is represented below as an object being present on the X1 side with respect to one object. Similarly, when the inner product of a vector starting from one object and terminating at another object and a vector oriented in the X2 direction is positive, this is represented below as an object being present on the X2 side with respect to one object. This is also true for the Y1 side, Y2 side, the Z1 side, and Z2 side.

In this embodiment, the X-axis, Y-axis, and Z-axis will be assumed to be mutually orthogonal, as an example. However, the present disclosure is not limited to this type of aspect. The X-axis, Y-axis, and Z-axis only need to cross one another.

The transport mechanism 92 bidirectionally moves the plurality of liquid discharging heads 1 in the X1 direction and X2 direction, under control of the control device 7. The transport mechanism 92 has a storage case 921 in which the plurality of liquid discharging heads 1 are stored, and also has an endless belt 922 to which the storage case 921 is fixed. An ink supply device 8 may be stored in the storage case 921 together with the liquid discharging heads 1.

The control device 7 supplies, to the liquid discharging heads 1, a driving signal Com that drives the liquid discharging heads 1 and a control signal SI that controls the liquid discharging heads 1. Each liquid discharging head 1 is driven in response to the driving signal Com under control of the control signal SI so as to discharge ink in the Z1 direction from part or all of a plurality of nozzles N provided in the liquid discharging head 1. That is, the liquid discharging head 1 discharges ink from part of all of the plurality of nozzles N in conjunction with the transport of the medium PP by the movement mechanism 91 and the bidirectional movement of the liquid discharging heads 1 by the transport mechanism 92, so that the discharged ink lands on the front surface of the medium PP and a desired image is formed on the front surface of the medium PP. The nozzle N will be described below with reference to FIGS. 3 and 4.

The ink supply device 8 holds ink. The ink supply device 8 also supplies ink held in the ink supply device 8 to the liquid discharging heads 1 in response to a control signal Ctr supplied from the control device 7. The ink supply device 8 also collects ink from the liquid discharging heads 1 in response to a control signal Ctr supplied from the control device 7 and causes the collected ink to flow back to the liquid discharging heads 1.

In this embodiment, it will be assumed as an example that the ink supply device 8 holds four types of inks in cyan, magenta, yellow, and black. It will be also assumed as an example that the liquid discharging apparatus 100 has four liquid discharging heads 1 in correspondence to the four types of inks. To simplify the description below, however, attention will be focused on one of the four types of inks held in the ink supply device 8 and on a liquid discharging head 1 corresponding to the one type of ink, the liquid discharging head 1 being one of the four liquid discharging heads 1 included in the liquid discharging apparatus 100.

2. Overview of the Ink Supply Device

The ink supply device 8 will be outlined below with reference to FIG. 2.

Figure 2:
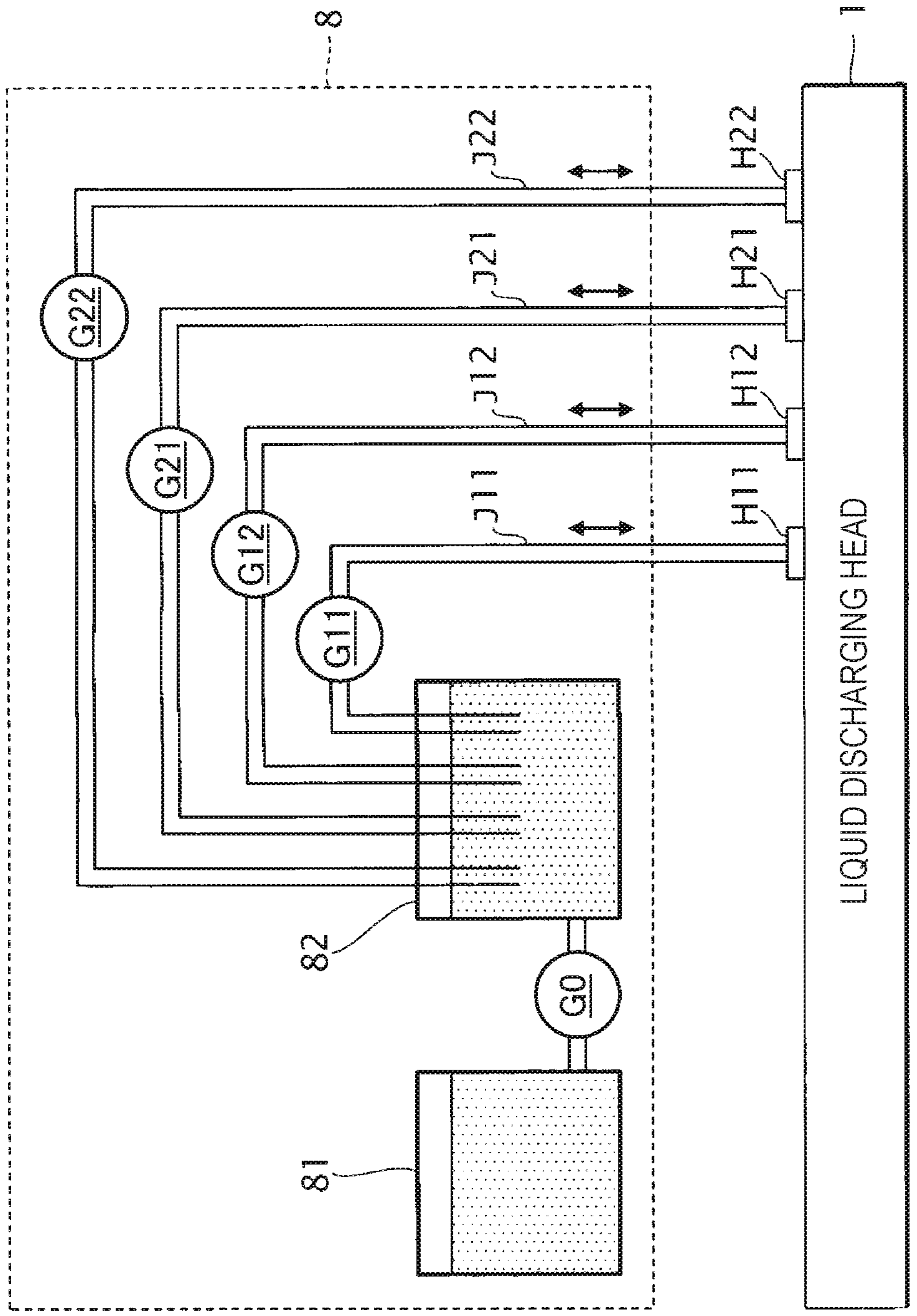
FIG. 2 illustrates an example of the structure of an ink supply device.

FIG. 2 illustrates the ink supply device 8.

As illustrated in FIG. 2, the ink supply device 8 has an ink holding container 81, an ink supply container 82, a pump G0, a pump G11, a pump G12, a pump G21, and a pump G22.

The ink holding container 81 holds ink. Possible examples of the ink holding container 81 include a cartridge attachable to and detachable from the liquid discharging apparatus 100, a bag-shaped ink pack formed from a flexible film, and an ink tank that can be replenished with ink.

The pump G0 supplies ink held in the ink holding container 81 to the ink supply container 82 in response to a control signal Ctr supplied from the control device 7.

The ink supply container 82 temporarily holds ink supplied from the ink holding container 81 and ink collected from the liquid discharging head 1.

The pump G11 supplies ink held in the ink supply container 82 to the liquid discharging head 1 through a circulation flow path J11 in response to a control signal Ctr supplied from the control device 7. The pump G11 also collects ink from the liquid discharging head 1 through the circulation flow path J11 and supplies the collected ink to the ink supply container 82, in response to a control signal Ctr supplied from the control device 7. The circulation flow path J11 is coupled to a coupling port H11 formed in the liquid discharging head 1. That is, through the circulation flow path J11 and coupling port H11, the pump G11 supplies ink to the liquid discharging head 1 and collects ink from the liquid discharging head 1. The circulation flow path J11 is an example of a first flow path.

The pump G12 supplies ink held in the ink supply container 82 to the liquid discharging head 1 through a circulation flow path J12 in response to a control signal Ctr supplied from the control device 7. The pump G12 also collects ink from the liquid discharging head 1 through the circulation flow path J12 and supplies the collected ink to the ink supply container 82, in response to a control signal Ctr supplied from the control device 7. The circulation flow path J12 is coupled to a coupling port H12 formed in the liquid discharging head 1. That is, through the circulation flow path J12 and coupling port H12, the pump G12 supplies ink to the liquid discharging head 1 and collects ink from the liquid discharging head 1. The circulation flow path J12 is an example of a second flow path.

The pump G21 supplies ink held in the ink supply container 82 to the liquid discharging head 1 through a circulation flow path J21 in response to a control signal Ctr supplied from the control device 7. The pump G21 also collects ink from the liquid discharging head 1 through the circulation flow path J21 and supplies the collected ink to the ink supply container 82, in response to a control signal Ctr supplied from the control device 7. The circulation flow path J21 is coupled to a coupling port H21 formed in the liquid discharging head 1. That is, through the circulation flow path J21 and coupling port H21, the pump G21 supplies ink to the liquid discharging head 1 and collects ink from the liquid discharging head 1. The circulation flow path J21 is an example of a third flow path.

The pump G22 supplies ink held in the ink supply container 82 to the liquid discharging head 1 through a circulation flow path J22 in response to a control signal Ctr supplied from the control device 7. The pump G22 also collects ink from the liquid discharging head 1 through the circulation flow path J22 and supplies the collected ink to the ink supply container 82, in response to a control signal Ctr supplied from the control device 7. The circulation flow path J22 is coupled to a coupling port H22 formed in the liquid discharging head 1. That is, through the circulation flow path J22 and coupling port H22, the pump G22 supplies ink to the liquid discharging head 1 and collects ink from the liquid discharging head 1. The circulation flow path J22 is an example of a fourth flow path.

3. Outline of the Liquid Discharging Head

The liquid discharging head 1 will be outlined below with reference to FIGS. 3 to 5.

Figure 3:
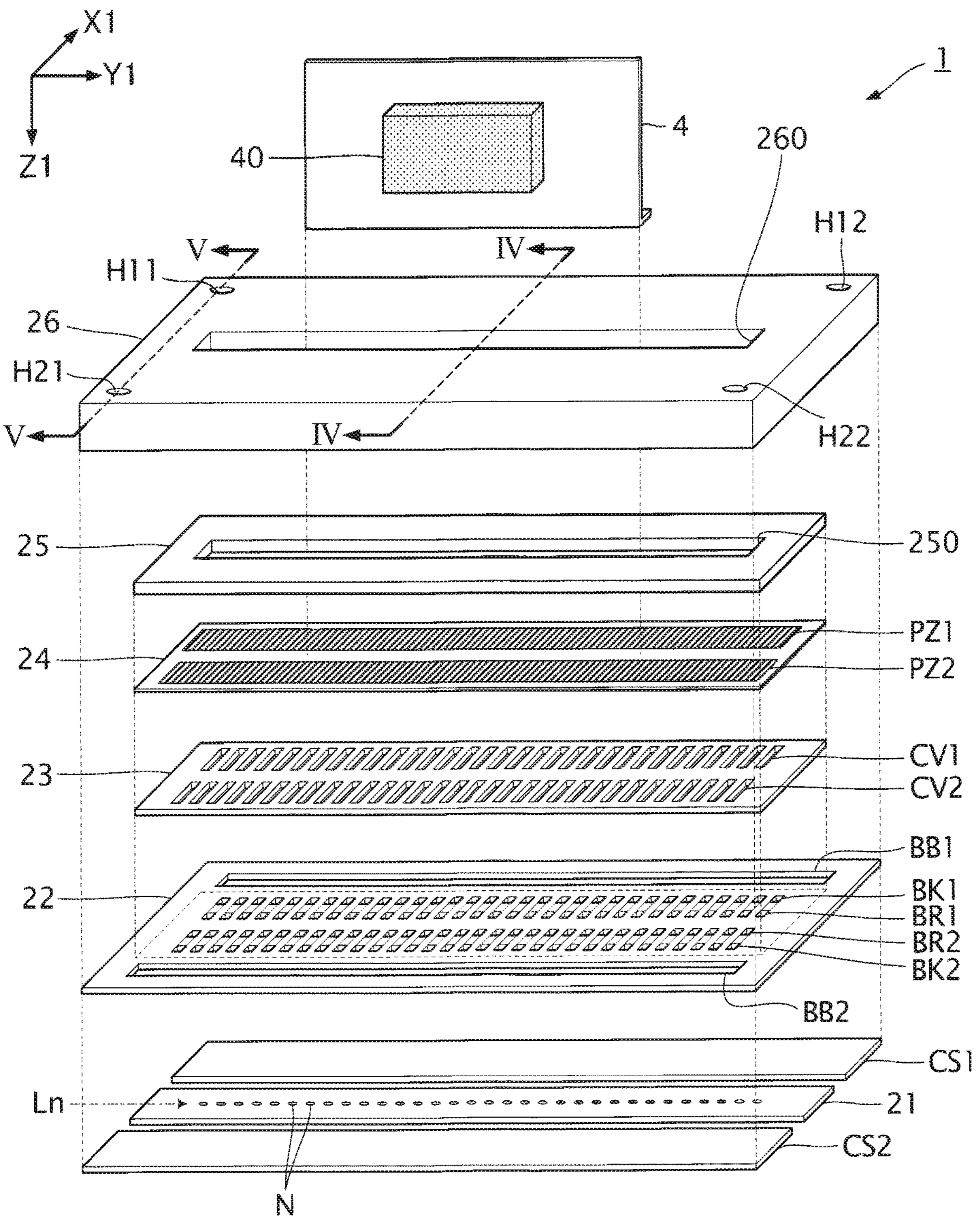
FIG. 3 is an exploded perspective view illustrating an example of the structure of a liquid discharging head.

FIG. 3 is an exploded perspective view illustrating the liquid discharging head 1. FIG. 4 is a sectional view taken along line IV-IV in FIG. 3. FIG. 5 is a sectional view taken along line V-V in FIG. 3.

Figure 4:
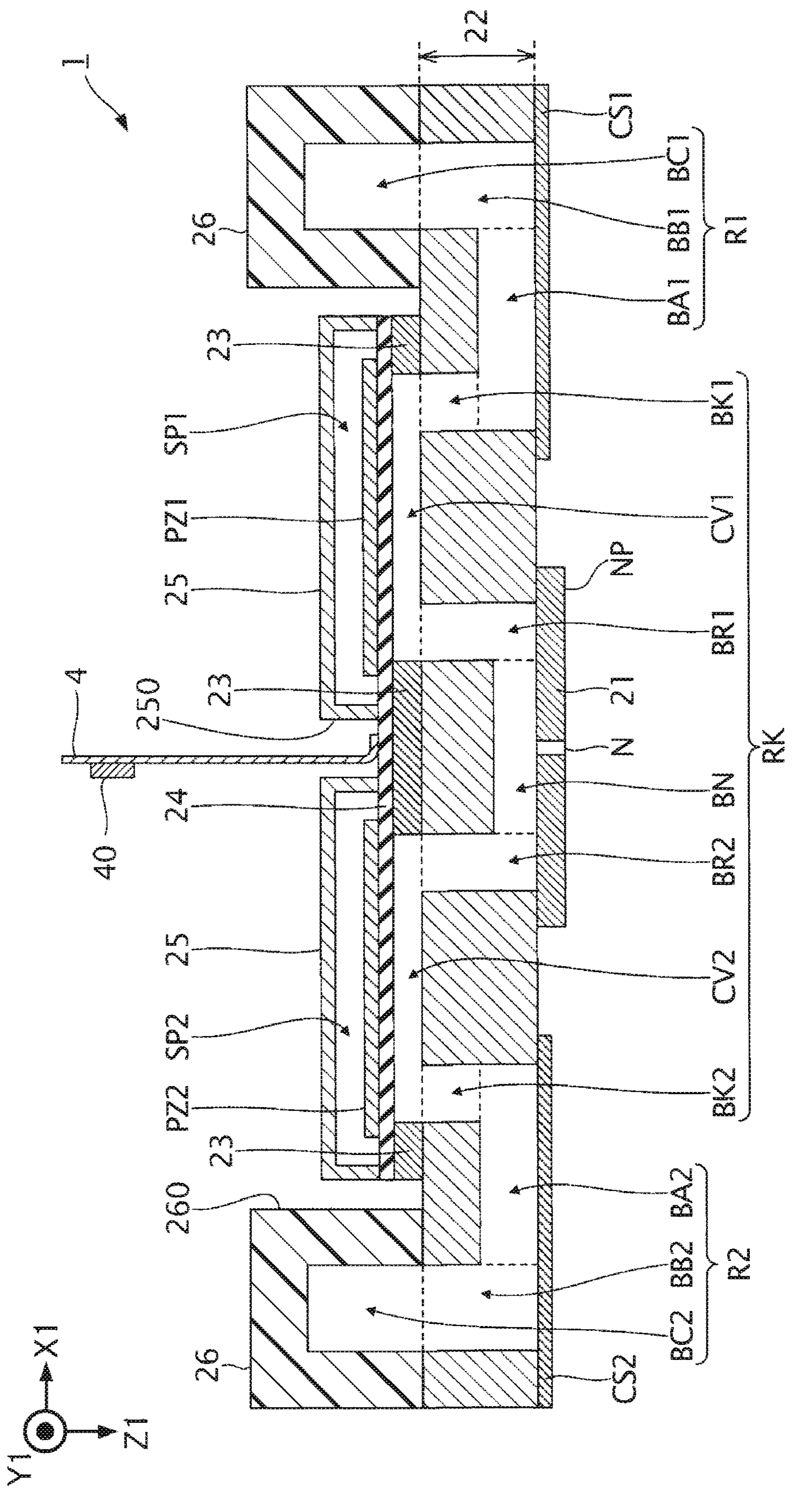
FIG. 4 is a sectional view illustrating the example of the structure of the liquid discharging head.
Figure 5:
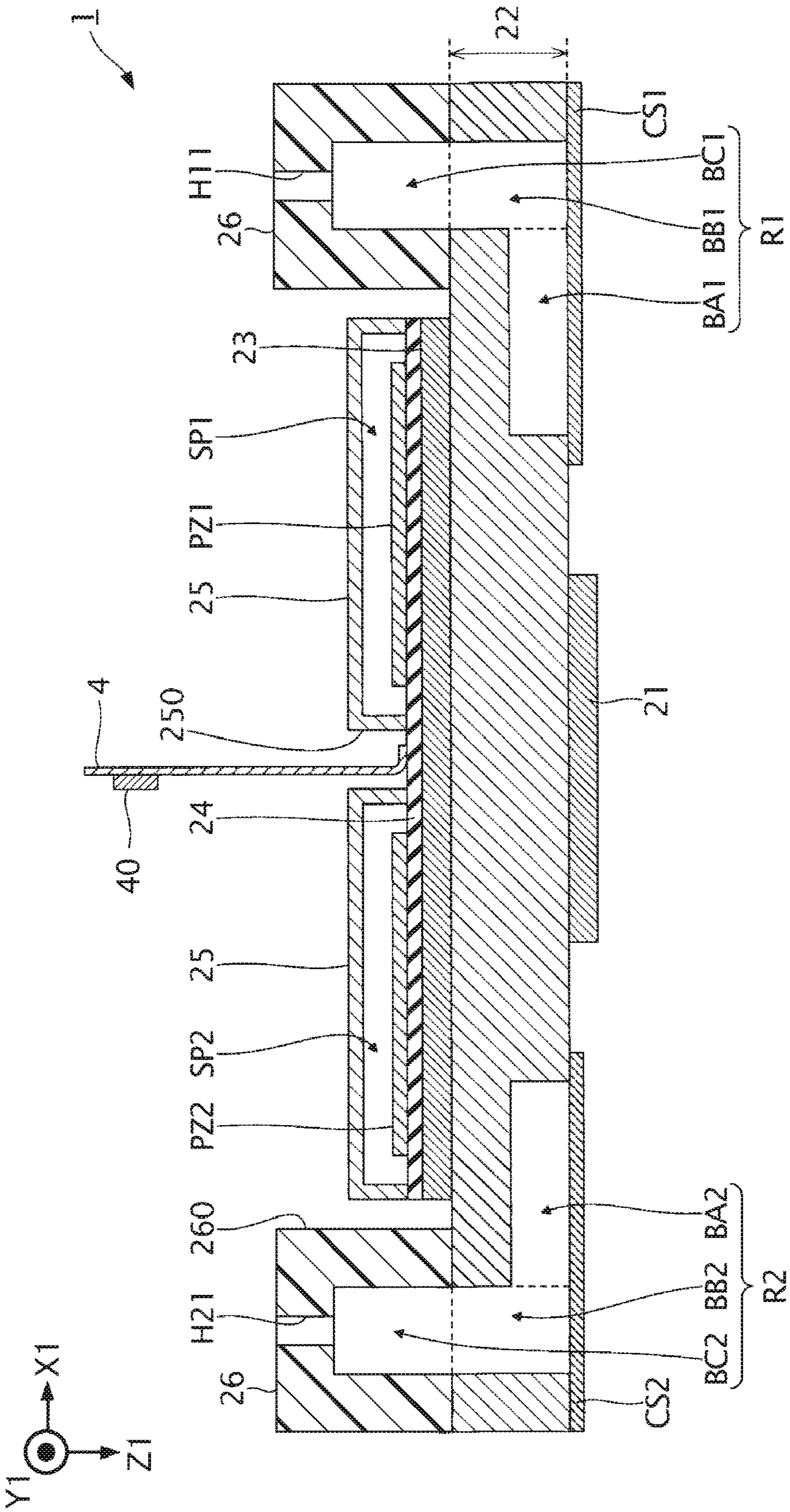
FIG. 5 is another sectional view illustrating the example of the structure of the liquid discharging head.

As illustrated in FIGS. 3 to 5, the liquid discharging head 1 has a nozzle substrate 21, compliance sheets CS1 and CS2, a communication plate 22, a pressure chamber substrate 23, a vibration plate 24, a sealing substrate 25, a flow path forming substrate 26, and a wiring board 4.

As illustrated in FIG. 3, the nozzle substrate 21 is a plate-like member that is elongated in the Y-axis direction and extends substantially in parallel to an XY plane. Here, the phrase "substantially parallel" indicates not only that the nozzle substrate 21 is completely parallel to an XY plane but also that when error is taken into consideration, the nozzle substrate 21 can be regarded to be parallel to an XY plane. In this embodiment, the phrase "substantially parallel" indicates that when an error of about 10% is taken into consideration, the nozzle substrate 21 can be regarded to be parallel to an XY plane. The nozzle substrate 21 is manufactured by, for example, using a semiconductor manufacturing technology such as etching to process a monocrystalline silicon substrate. In the manufacturing of the nozzle substrate 21, however, any known material and any known manufacturing method may be used.

M nozzles N are formed in the nozzle substrate 21, M being a natural number greater than or equal to 2. Each nozzle N is a through-hole formed in the nozzle substrate 21. In this embodiment, it will be assumed that the M nozzles N are arranged in the nozzle substrate 21 so as to extend in the Y-axis direction. In the description below, a row of the M nozzles N extending in the Y-axis direction may be referred to as a nozzle row Ln.

As illustrated in FIGS. 3 to 5, the communication plate 22 is disposed on the Z2 side with respect to the nozzle substrate 21. The communication plate 22 is a plate-like member that is elongated in the Y-axis direction and extends substantially in parallel to an XY plane. The communication plate 22 is manufactured by, for example, using a semiconductor manufacturing technology to process a monocrystalline silicon substrate. In the manufacturing of the communication plate 22, however, any known material and any known manufacturing method may be used.

In the communication plate 22, flow paths for ink are formed.

Specifically, in the communication plate 22, one common flow path BB1 and one common flow path BB2 are formed so as to extend in the Y-axis direction, the common flow path BB2 being on the X2 side with respect to the common flow path BB1. In the communication plate 22, one common flow path BA1 and one common flow path BA2 are also formed so as to extend in the Y-axis direction, the common flow path BA1 being between the common flow path BB1 and the common flow path BB2, the common flow path BA2 being between the common flow path BA1 and the common flow path BB2.

In the communication plate 22, M coupling flow paths BK1, M coupling flow paths BK2, M coupling flow paths BR1, M coupling flow paths BR2, and M nozzle flow paths BN are also formed in correspondence to the M nozzles N.

The coupling flow path BK1 is formed on the X2 side with respect to the common flow path BB1 and on the Z2 side with respect to the common flow path BA1 so as to extend in the Z-axis direction and communicate with the common flow path BA1. The coupling flow path BR1 is formed on the X2 side with respect to the coupling flow path BK1 so as to extend in the Z-axis direction. The coupling flow path BK2 is formed on the X1 side with respect to the common flow path BB2 and on the Z2 side with respect to the common flow path BA2 so as to extend in the Z-axis direction ands communicate with the common flow path BA2. The coupling flow path BR2 is formed on the X2 side with respect to the common flow path BR1 and on the X1 side with respect to the coupling flow path BK2 so as to extend in the Z-axis direction. The nozzle flow path BN is formed between the coupling flow path BR1 and the coupling flow path BR2 so as to communicate with the common flow path BR1 and common flow path BR2 and communicate with the nozzle N corresponding to the nozzle flow path BN.

In the description below, the common flow path BA1 and common flow path BA2 may be collectively referred to as the common flow path BA; the common flow path BB1 and common flow path BB2 may be collectively referred to as the common flow path BB; the coupling flow path BK1 and coupling flow path BK2 may be collectively referred to as the coupling flow path BK; and the coupling flow path BR1 and coupling flow path BR2 may be collectively referred to as the coupling flow path BR.

As illustrated in FIGS. 3 to 5, the pressure chamber substrate 23 is disposed on the Z2 side with respect to the communication plate 22. The pressure chamber substrate 23 is a plate-like member that is elongated in the Y-axis direction and extends substantially in parallel to an XY plane. The pressure chamber substrate 23 is manufactured by, for example, using a semiconductor manufacturing technology to process a monocrystalline silicon substrate. In the manufacturing of the pressure chamber substrate 23, however, any known material and any known manufacturing method may be used.

In the pressure chamber substrate 23, flow paths for ink are formed. Specifically, in the pressure chamber substrate 23, M pressure chambers CV1 and M pressure chambers CV2 are formed in correspondence to the M nozzles N. The pressure chamber CV1 is formed on the Z2 side with respect to the coupling flow path BK1 and on the Z2 side with respect to the coupling flow path BR1 so as to extend in the X-axis direction and communicate with the coupling flow path BK1 and coupling flow path BR1. The pressure chamber CV2 is formed on the Z2 side with respect to the coupling flow path BK2 and on the Z2 side with respect to the coupling flow path BR2 so as to extend in the X-axis direction and communicate with the coupling flow path BK2 and coupling flow path BR2.

In the description below, the pressure chamber CV1 and pressure chamber CV2 may be collectively referred to as the pressure chamber CV.

In the description below, the coupling flow path BK1, the pressure chamber CV1 communicating with the coupling flow path BK1, the coupling flow path BR1 communicating with the pressure chamber CV1, the nozzle flow path BN communicating with the coupling flow path BR1, the coupling flow path BR2 communicating with the nozzle flow path BN, the pressure chamber CV2 communicating with the coupling flow path BR2, and the coupling flow path BK2 communicating with the pressure chamber CV2 may be collectively referred to as the individual flow path RK. In the description below, the individual flow path RK corresponding to an m-th nozzle N of the M nozzles N may be referred to as the individual flow path RK[m]. The variable m is a natural number greater than or equal to 1 and smaller than or equal to M. In this embodiment, the M individual flow paths RK[1] to RK[M] corresponding to the M nozzles N are placed in the Y-axis direction.

As illustrated in FIGS. 3 to 5, the vibration plate 24 is disposed on the Z2 side with respect to the pressure chamber substrate 23. The vibration plate 24 is a plate-like member that is elongated in the Y-axis direction and extends substantially in parallel to an XY plane. The vibration plate 24 can elastically vibrate. The vibration plate 24 has, for example, an elastic film formed from silicon oxide and an insulator film formed from zirconium oxide.

As illustrated in FIGS. 3 to 5, on the Z2 side with respect to the vibration plate 24, M piezoelectric elements PZ1 are provided in correspondence to the M pressure chambers CV1 and M piezoelectric elements PZ2 are provided in correspondence to the M pressure chambers CV2. In the description below, the piezoelectric element PZ1 and piezoelectric element PZ2 may be collectively referred to as the piezoelectric element PZ. The piezoelectric element PZ is a passive element that deforms in response to a change in the potential of the driving signal Com. Specifically, the piezoelectric element PZ is driven and deforms in response to a change in the potential of the driving signal Com. The vibration plate 24 vibrates by being triggered by the deformation of the piezoelectric element PZ. When the vibration plate 24 vibrates, pressure in the pressure chamber CV varies. When pressure in the pressure chamber CV varies, ink in the pressure chamber CV is discharged from the nozzle N through the coupling flow path BR and nozzle flow path BN.

As illustrated in FIGS. 3 to 5, the sealing substrate 25 is provided on the Z2 side with respect to the pressure chamber substrate 23 to protect the M piezoelectric elements PZ1 and M piezoelectric elements PZ2. The sealing substrate 25 is a plate-like member that is elongated in the Y-axis direction and extends substantially in parallel to an XY plane. The sealing substrate 25 is manufactured by, for example, using a semiconductor manufacturing technology to process a monocrystalline silicon substrate. In the manufacturing of the sealing substrate 25, however, any known material and any known manufacturing method may be used.

A recess that covers the M piezoelectric elements PZ1 and a recess that covers the M piezoelectric elements PZ2 are formed in the Z1-side surface of the two surfaces of the sealing substrate 25, the two surfaces having a normal in the Z-axis direction. A sealing space formed between the vibration plate 24 and the sealing substrate 25 so as to cover the M piezoelectric elements PZ1 will be referred to below as a sealing space SP1. Similarly, a sealing space formed between the vibration plate 24 and the sealing substrate 25 so as to cover the M piezoelectric elements PZ2 will be referred to below as a sealing space SP2. In the description below, the sealing space SP1 and sealing space SP2 may be collectively referred to as the sealing space SP. The sealing space SP seals the piezoelectric elements PZ to prevent them from being affected by moisture or the like and undergoing alteration.

A through-hole 250 is formed in the sealing substrate 25. The through-hole 250 is positioned between the sealing space SP1 and the sealing space SP2 when the sealing substrate 25 is viewed in the Z1 direction. The through-hole 250 extends from the Z1-side surface of the sealing substrate 25 to the Z2-side surface of the sealing substrate 25. The wiring board 4 is inserted into the through-hole 250.

As illustrated in FIGS. 3 to 5, the flow path forming substrate 26 is disposed on the Z2 side with respect to the communication plate 22. The flow path forming substrate 26 is a plate-like member that is elongated in the Y-axis direction and extends substantially in parallel to an XY plane. The flow path forming substrate 26 is manufactured by, for example, injection-molding a resin material. In the manufacturing of the flow path forming substrate 26, however, any known material and any known manufacturing method may be used.

In the flow path forming substrate 26, flow paths for ink are formed.

Specifically, in the flow path forming substrate 26, one common flow path BC1 and one common flow path BC2 are formed so as to extend in the Y-axis direction. The common flow path BC1 is formed on the Z2 side with respect to the common flow path BB1 so as to communicate with the common flow path BB1. The common flow path BC2 is formed on the Z2 side with respect to the common flow path BB2 and on the X2 side with respect to the common flow path BC1 so as to communicate with the common flow path BB2. In the description below, the common flow path BC1 and common flow path BC2 may be collectively referred to as the common flow path BC.

In the description below, the common flow path BA1, the common flow path BB1 communicating with the common flow path BA1, and the common flow path BC1 communicating with the common flow path BB1 may be collectively referred to as the common flow path R1. In the description below, the common flow path BA2, the common flow path BB2 communicating with the common flow path BA2, and the common flow path BC2 communicating with the common flow path BB2 may be collectively referred to as the common flow path R2. In the description below, the common flow path R1 and common flow path R2 may be collectively referred to as the common flow path R. The common flow path R1 is an example of a first common flow path, and the common flow path R2 is an example of a second common flow path.

At the flow path forming substrate 26, the coupling port H11 and coupling port H12, which communicate with the common flow path BC1, as well as the coupling port H21 and coupling port H22, which communicate with the common flow path BC2, are disposed.

Ink is supplied from the ink supply container 82 through the circulation flow path J11 and coupling port H11 to the common flow path R1 including the common flow path BC1. Part of the ink held in the common flow path R1 is collected in the ink supply container 82 through the circulation flow path J11 and coupling port H11. Similarly, ink is supplied from the ink supply container 82 through the circulation flow path J12 and coupling port H12 to the common flow path R1 including the common flow path BC1. Part of ink held in the common flow path R1 is collected in the ink supply container 82 through the circulation flow path J12 and coupling port H12. Similarly, ink is supplied from the ink supply container 82 through the circulation flow path J21 and coupling port H21 to the common flow path R2 including the common flow path BC2. Part of ink held in the common flow path R2 is collected in the ink supply container 82 through the circulation flow path J21 and coupling port H21. Similarly, ink is supplied from the ink supply container 82 through the circulation flow path J22 and coupling port H22 to the common flow path R2 including the common flow path BC2. Part of ink held in the common flow path R2 is collected in the ink supply container 82 through the circulation flow path J22 and coupling port H22.

Part of the ink supplied to the common flow path R1 is filled in the pressure chamber CV1 through the coupling flow path BK1. When the piezoelectric element PZ1 is driven in response to a driving signal Com, part of the ink filled in the pressure chamber CV1 is discharged from the nozzle N through the coupling flow path BR1. Part of the ink supplied to the pressure chamber CV1 is filled in the pressure chamber CV2 through the coupling flow path BR1, nozzle flow path BN, and coupling flow path BR2. When the piezoelectric element PZ2 is driven in response to a driving signal Com, part of the ink filled in the pressure chamber CV2 is discharged from the nozzle N through the coupling flow path BR2.

A through-hole 260 is formed in the flow path forming substrate 26. The through-hole 260 is positioned between the common flow path BC1 and the common flow path BC2 when the flow path forming substrate 26 is viewed in the Z1 direction. The through-hole 260 extends from the Z1-side surface of the flow path forming substrate 26 to the Z2-side surface of the flow path forming substrate 26. The wiring board 4 is inserted into the through-hole 260.

As illustrated in FIGS. 3 to 5, the wiring board 4 is mounted on the Z2-side surface of the two surfaces of the vibration plate 24, the two surfaces having a normal in the Z-axis direction. The wiring board 4 is a component that electrically couples the liquid discharging head 1 to the control device 7. A preferable example of the wiring board 4 is a flexible wiring board such as a flexible printed circuit (FPC) or flexible flat cable (FFC). An integrated circuit 40 is mounted on the wiring board 4. The integrated circuit 40 is an electric circuit that switches between supply and non-supply of a driving signal Com to the piezoelectric element PZ1 under control of the control signal SI.

As illustrated in FIGS. 3 to 5, the compliance sheet CS1 is disposed on the Z1 side with respect to the communication plate 22 and on the X1 side with respect to the nozzle substrate 21 so as to cover the common flow path BA1 and common flow path BB1. Similarly, the compliance sheet CS2 is disposed on the Z1 side with respect to the communication plate 22 and on the X2 side with respect to the nozzle substrate 21 so as to cover the common flow path BA2 and common flow path BB2. In the description below, the compliance sheet CS1 and compliance sheet CS2 may be collectively referred to as the compliance sheet CS. The compliance sheet CS is a plate-like member that is elongated in the Y-axis direction and extends substantially in parallel to an XY plane. The compliance sheet CS, which is formed from an elastic material, eliminates variations in the pressure of ink in the common flow path BA and coupling flow path BK.

Although not illustrated, the liquid discharging head 1 has a cap that seals a nozzle surface NP, which is the Z1-side surface of the two surfaces of the nozzle substrate 21, the two surfaces having a normal in the Z-axis direction. The cap seals the nozzle surface NP of the nozzle substrate 21, in which nozzles N are formed, during a period in which ink is not discharged from nozzles N.

4. Operation of the Liquid Discharging Head

Operation of the liquid discharging head 1 will be described below with reference to FIGS. 6 to 9.

Figure 6:
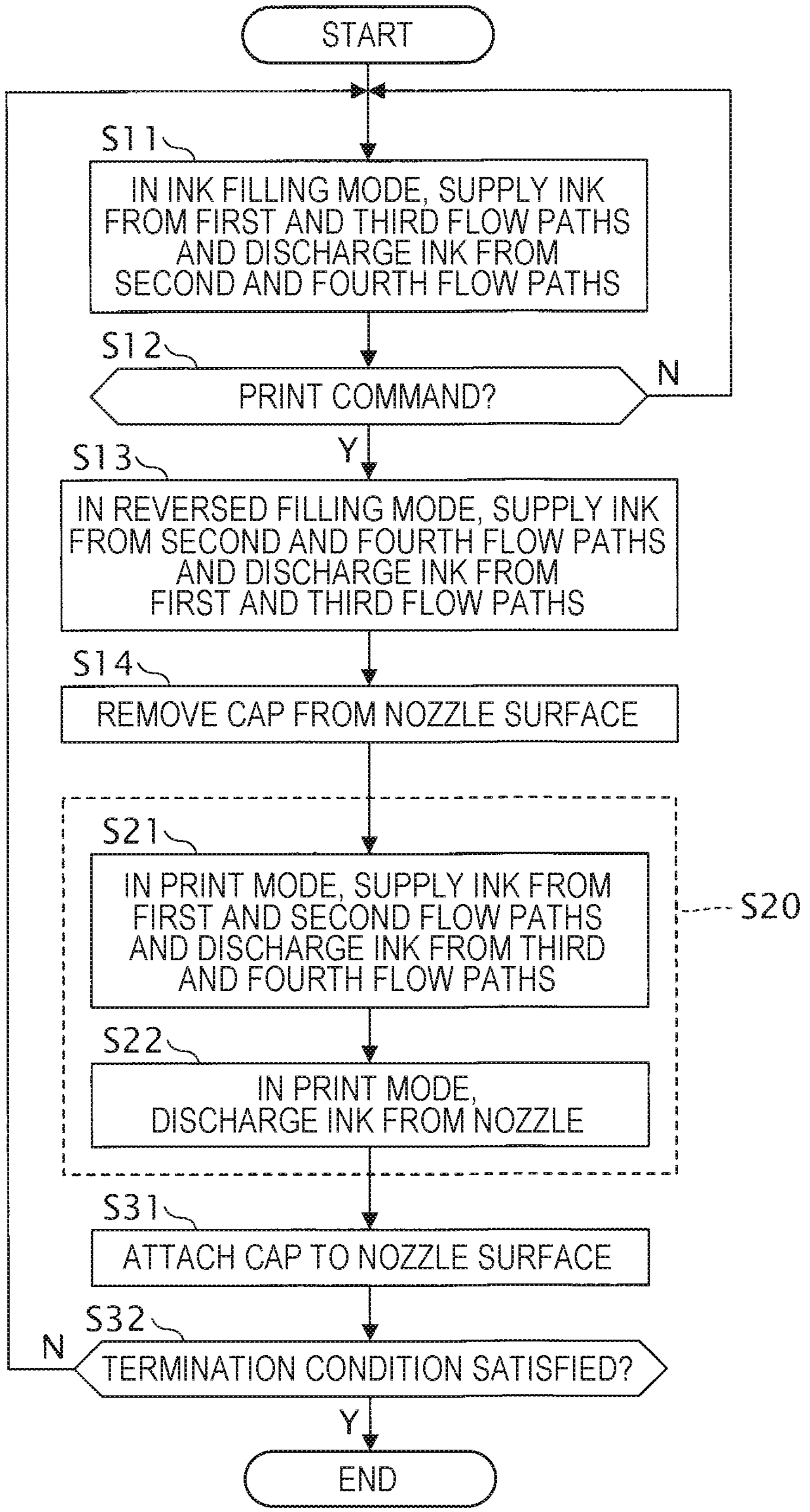
FIG. 6 is a flowchart illustrating an example of operation of the liquid discharging apparatus.

FIG. 6 is a flowchart illustrating an example of operation of the liquid discharging apparatus 100. Processing illustrated in the flowchart in FIG. 6 is started when, for example, the liquid discharging apparatus 100 is powered on.

When the liquid discharging apparatus 100 is powered on, the control device 7 controls the ink supply device 8 so that the liquid discharging head 1 operates in an ink filling mode (S11), as illustrated in FIG. 6. The ink filling mode is an operation mode, of the liquid discharging head 1, in which ink is filled in the pressure chamber CV in the liquid discharging head 1.

Figure 7:
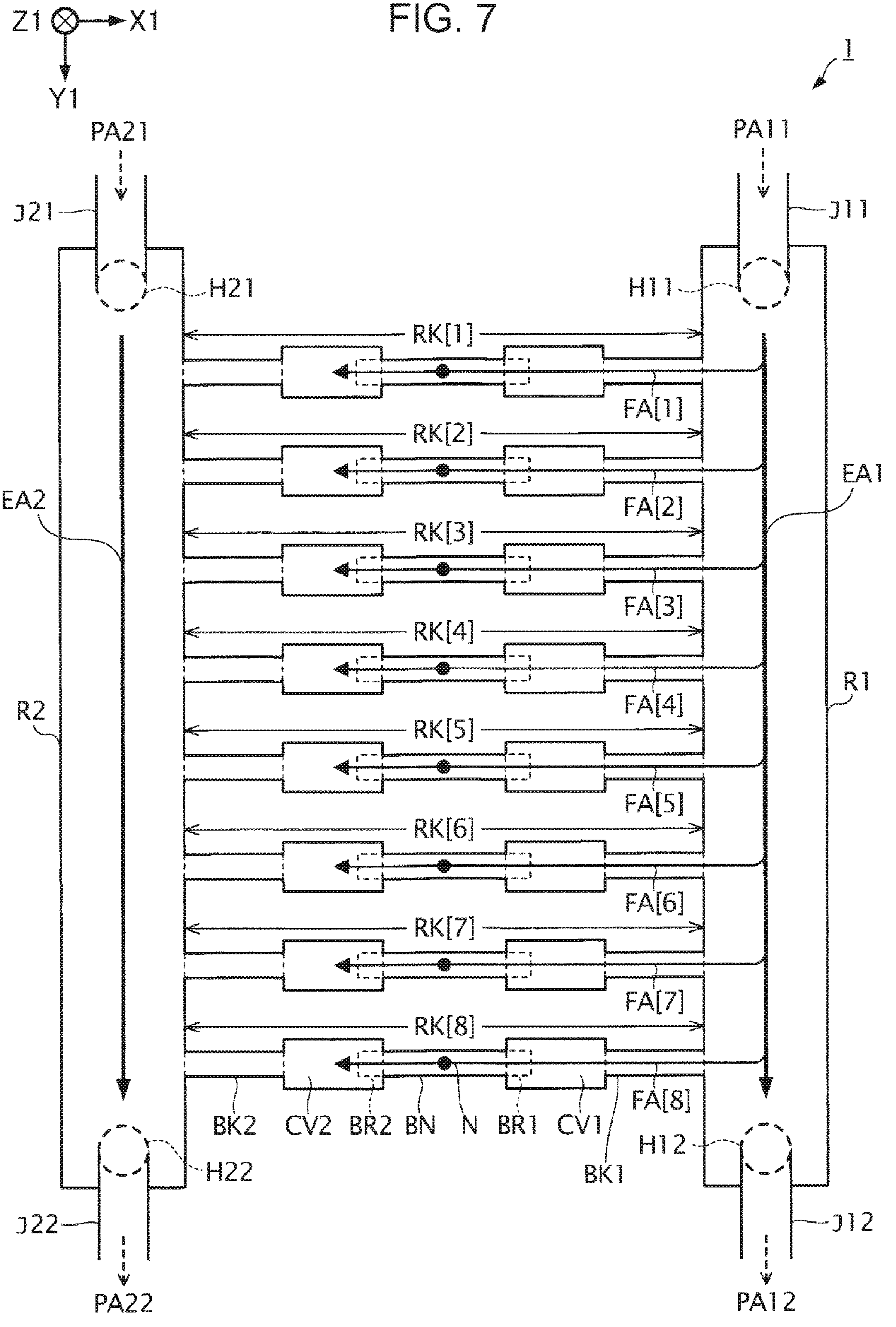
FIG. 7 illustrates an example of operation of the liquid discharging head in an ink filling mode.

FIG. 7 illustrates an example of operation of the liquid discharging head in the ink filling mode. Specifically, FIG. 7 illustrates flows of ink in the common flow path R and individual flow path RK when the liquid discharging head 1 is planarly viewed in the Z1 direction. In FIG. 7 and FIGS. 8 to 10, which will be referenced later, the coupling flow path BK is drawn so as to extend in the X-axis direction for convenience of illustration. However, in the liquid discharging head 1, the coupling flow path BK extends in the Z-axis direction. In FIG. 7 and FIGS. 8 to 10, which will be referenced later, the value M is assumed to be 8, as an example.

In the ink filling mode: through the circulation flow path J11, ink is supplied to the common flow path R1; through the circulation flow path J12, ink is collected from the common flow path R1; through the circulation flow path J21, ink is supplied to the common flow path R2; and through the circulation flow path J22, ink is collected from the common flow path R2; as illustrated in FIG. 7. In the ink filling mode, therefore, ink flows in the common flow path R1 in the Y1 direction as indicated by the arrow EA1; and ink flows in the common flow path R2 in the Y1 direction as indicated by the arrow EA2.

In the ink filling mode in this embodiment, it will be assumed that a supply amount PA11 by which ink is supplied from the circulation flow path J11 to the common flow path R1 is greater than a supply amount PA21 by which ink is supplied from the circulation flow path J21 to the common flow path R2. In the ink filling mode in this embodiment, therefore, ink in the individual flow path RK[m] flows from the common flow path R1 to the common flow path R2 in the X2 direction, as indicated by the arrow FA[m]. Thus, ink is filled in the pressure chamber CV1 and pressure chamber CV2 included in the individual flow path RK[m].

In the ink filling mode in this embodiment, it will be assumed as an example that a collection amount PA12 by which ink is collected from the common flow path R1 through the circulation flow path J12 is greater than a collection amount PA22 by which ink is collected from the common flow path R2 through the circulation flow path J22. However, the present disclosure is not limited to this type of aspect.

In this embodiment, it will be also assumed as an example that the following relation holds among the supply amount PA11, supply amount PA21, collection amount PA12, and collection amount PA22: $PA11-PA12>PA21-PA22$. In the ink filling mode in this embodiment, therefore, ink in the individual flow path RK[m] flows from the common flow path R1 to the common flow path R2 in the X2 direction, as indicated by the arrow FA[m]. Thus, ink is filled in the pressure chamber CV1 and pressure chamber CV2 included in the individual flow path RK[m].

In this embodiment, the circulation flow path J11 communicates with the common flow path R1 at the Y2-side end of the common flow path R1 in the Y-axis direction, and the circulation flow path J12 communicates with the common flow path R1 at the Y1-side end of the common flow path R1 in the Y-axis direction, as illustrated in FIG. 7. In the ink filling mode in this embodiment, therefore, it is possible to preferably restrain a bubble from staying in the common flow path R1 at an end of the circulation flow path J11, the end being more on the Y2 side than the communication portion of the circulation flow path J11 is, or at an end of the circulation flow path J12, the end being more on the Y1 side than the communication portion of the circulation flow path J12 is, unlike an aspect in which, for example, the circulation flow path J11 communicates with the common flow path R1 at the central portion of the common flow path R1 in the Y-axis direction and the circulation flow path J12 communicates with the common flow path R1 at the central portion of the common flow path R1 in the Y-axis direction. In this embodiment, the Y-axis direction, that is, the Y1 direction and Y2 direction, is an example of a first direction; the Y2 side is an example of one side in the first direction; and the Y1 side is an example of another side in the first direction.

In this embodiment, the circulation flow path J21 communicates with the common flow path R2 at the Y2-side end of the common flow path R2 in the Y-axis direction, and the circulation flow path J22 communicates with the common flow path R2 at the Y1-side end of the common flow path R2 in the Y-axis direction, as illustrated in FIG. 7. In the ink filling mode in this embodiment, therefore, it is possible to preferably restrain a bubble from staying in the common flow path R2 at an end of the circulation flow path J21, the end being more on the Y2 side than the communication portion of the circulation flow path J21 is, or at an end of the circulation flow path J22, the end being more on the Y1 side than the communication portion of the circulation flow path J22 is, unlike an aspect in which, for example, the circulation flow path J21 communicates with the common flow path R2 at the central portion of the common flow path R2 in the Y-axis direction and the circulation flow path J22 communicates with the common flow path R2 at the central portion of the common flow path R2 in the Y-axis direction.

In the ink filling mode in this embodiment, ink flows in the individual flow path RK[m] as indicated by the arrow FA[m]. In addition, ink circulates in the common flow path R1 as indicated by the arrow EA1, and also circulates in the common flow path R2 as indicated by the arrow EA2.

An aspect in which ink flows in so-called cavity circulation will now be considered as a reference example. In cavity circulation, the circulation flow path J12 and circulation flow path J21 in FIG. 7 are not present in; ink supplied from the circulation flow path J11 is discharged from the circulation flow path J22 through the common flow path R1, individual flow path RK[m], and common flow path R2. Generally, the individual flow path RK[m] has a smaller cross-sectional area, and thereby has a higher flow path resistance than the common flow path R1 and common flow path R2. Therefore, in an aspect in which ink circulates from the common flow path R1 through the individual flow path RK[m] to the common flow path R2 as in the reference example, when ink flows from the common flow path R1 to the individual flow path RK[m], a bubble in the ink may not flow into the individual flow path RK[m] but may stay in the common flow path R1. Therefore, in the aspect in which ink circulates from the common flow path R1 through the individual flow path RK[m] to the common flow path R2 as in the reference example, a bubble is highly likely to stay in the common flow path R1.

In contrast to this, in the ink filling mode in this embodiment, ink is circulated in the common flow path R1 and is also circulated in the common flow path R2. This can suppress the possibility that a bubble stays in the common flow path R1, unlike the reference example.

Referring again to FIG. 6, the control device 7 decides whether the liquid discharging head 1 has received a print command to execute print processing for forming an image on a medium PP from, for example, a device outside the liquid discharging head 1 (S12).

When the decision result in step S12 is No, the control device 7 causes the process to proceed to step S11.

When the decision result in step S12 is Yes, the control device 7 controls the ink supply device 8 so that the liquid discharging head 1 operates in a reversed filling mode (S13). The reversed filling mode is an operation mode, of the liquid discharging head 1, in which ink is filled in the pressure chamber CV in the liquid discharging head 1.

Figure 8:
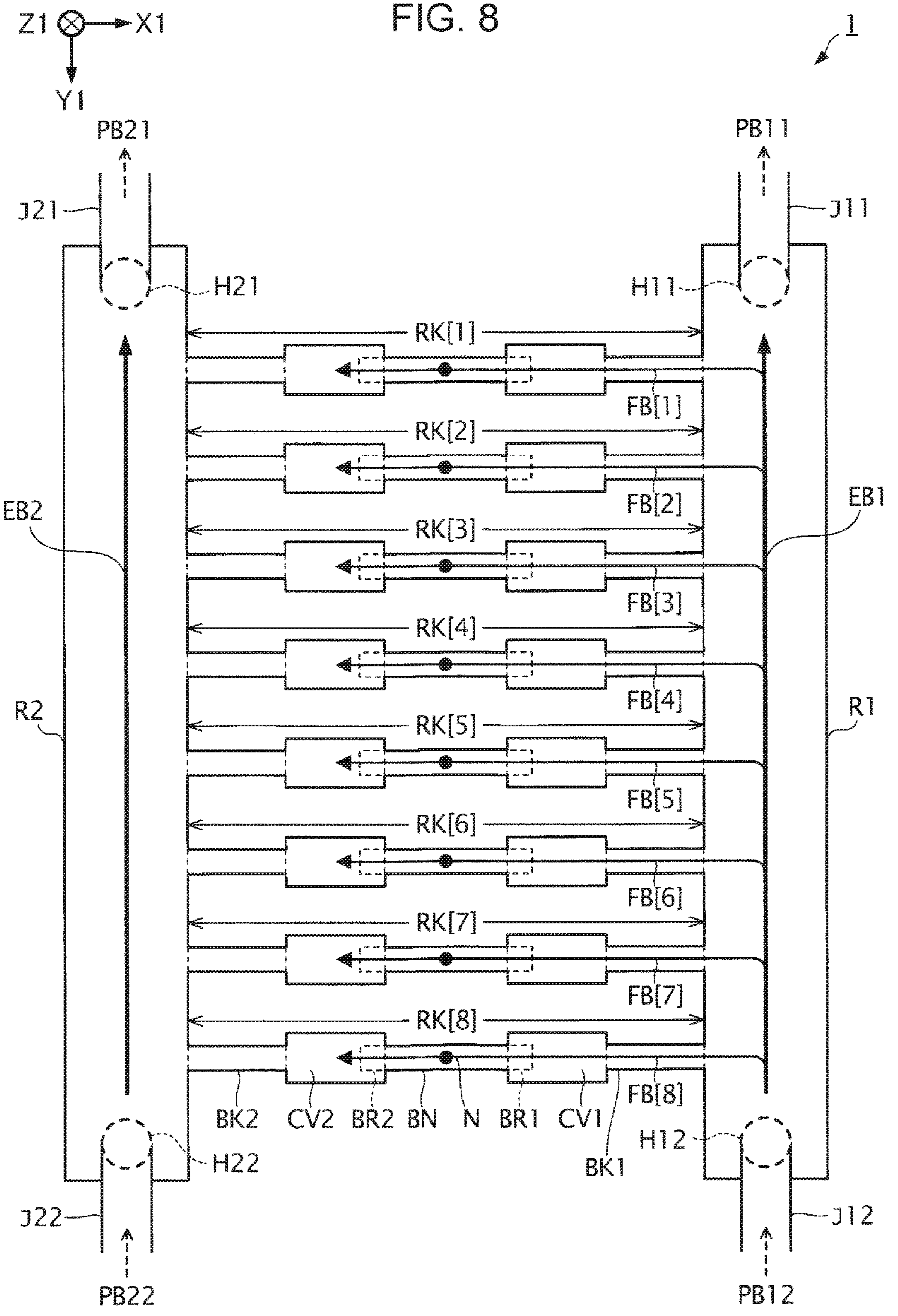
FIG. 8 illustrates an example of operation of the liquid discharging head in a reversed filling mode.

FIG. 8 illustrates operation of the liquid discharging head 1 in the reversed filling mode. Specifically, FIG. 8 illustrates flows of ink in the common flow path R and individual flow path RK when the liquid discharging head 1 is planarly viewed in the Z1 direction, as in FIG. 7.

In the reversed filling mode: through the circulation flow path J11, ink is collected from the common flow path R1; through the circulation flow path J12, ink is supplied to the common flow path R1; through the circulation flow path J21, ink is collected from the common flow path R2; and through the circulation flow path J22, ink is supplied to the common flow path R2; as illustrated in FIG. 8. In the reversed filling mode, therefore, ink flows in the common flow path R1 in the Y2 direction as indicated by the arrow EB1; and ink flows in the common flow path R2 in the Y2 direction as indicated by the arrow EB2.

In the reversed filling mode in this embodiment, it will be assumed that a supply amount PB12 by which ink is supplied from the circulation flow path J12 to the common flow path R1 is greater than a supply amount PB22 by which ink is supplied from the circulation flow path J22 to the common flow path R2. In the reversed filling mode in this embodiment, therefore, ink in the individual flow path RK[m] flows from the common flow path R1 to the common flow path R2 in the X2 direction, as indicated by the arrow FB[m]. Thus, ink is filled in the pressure chamber CV1 and pressure chamber CV2 included in the individual flow path RK[m].

In the reversed filling mode in this embodiment, it will be assumed as an example that a collection amount PB11 by which ink is collected from the common flow path R1 through the circulation flow path J11 is greater than a collection amount PB21 by which ink is collected from the common flow path R2 through the circulation flow path J21. However, the present disclosure is not limited to this type of aspect.

In this embodiment, it will be also assumed as an example that the following relation holds among the supply amount PB12, supply amount PB22, collection amount PB11, and collection amount PB21: $PB12-PB11>PB22-PB21$. In the reversed filling mode in this embodiment, therefore, ink in the individual flow path RK[m] flows from the common flow path R1 to the common flow path R2 in the X2 direction, as indicated by the arrow FB[m]. Thus, ink is filled in the pressure chamber CV1 and pressure chamber CV2 included in the individual flow path RK[m].

Thus, in the ink filling mode in this embodiment, the liquid discharging head 1 fills ink in the pressure chamber CV while causing ink in the common flow path R to flow in the Y1 direction. In addition, in the reversed filling mode, the liquid discharging head 1 fills ink in the pressure chamber CV while causing ink in the common flow path R to flow in the Y2 direction. In this embodiment, therefore, it is possible to reduce the possibility that a bubble stays in the common flow path R when compared with an aspect in which ink in the common flow path R flows only in one direction as in an aspect in which, for example, only one of the filling of ink in the pressure chamber CV in the ink filling mode and the filling of ink in the pressure chamber CV in the reversed filling mode is performed.

Referring again to FIG. 6, the control device 7 controls the liquid discharging apparatus 100 so that the cap is removed from the nozzle surface NP (S14).

The control device 7 then controls the ink supply device 8 so that the liquid discharging head 1 operates in a print mode (S20). The print mode is an operation mode, of the liquid discharging head 1, in which ink filled in the pressure chamber CV in the liquid discharging head 1 is discharged from the nozzle N.

Figure 9:
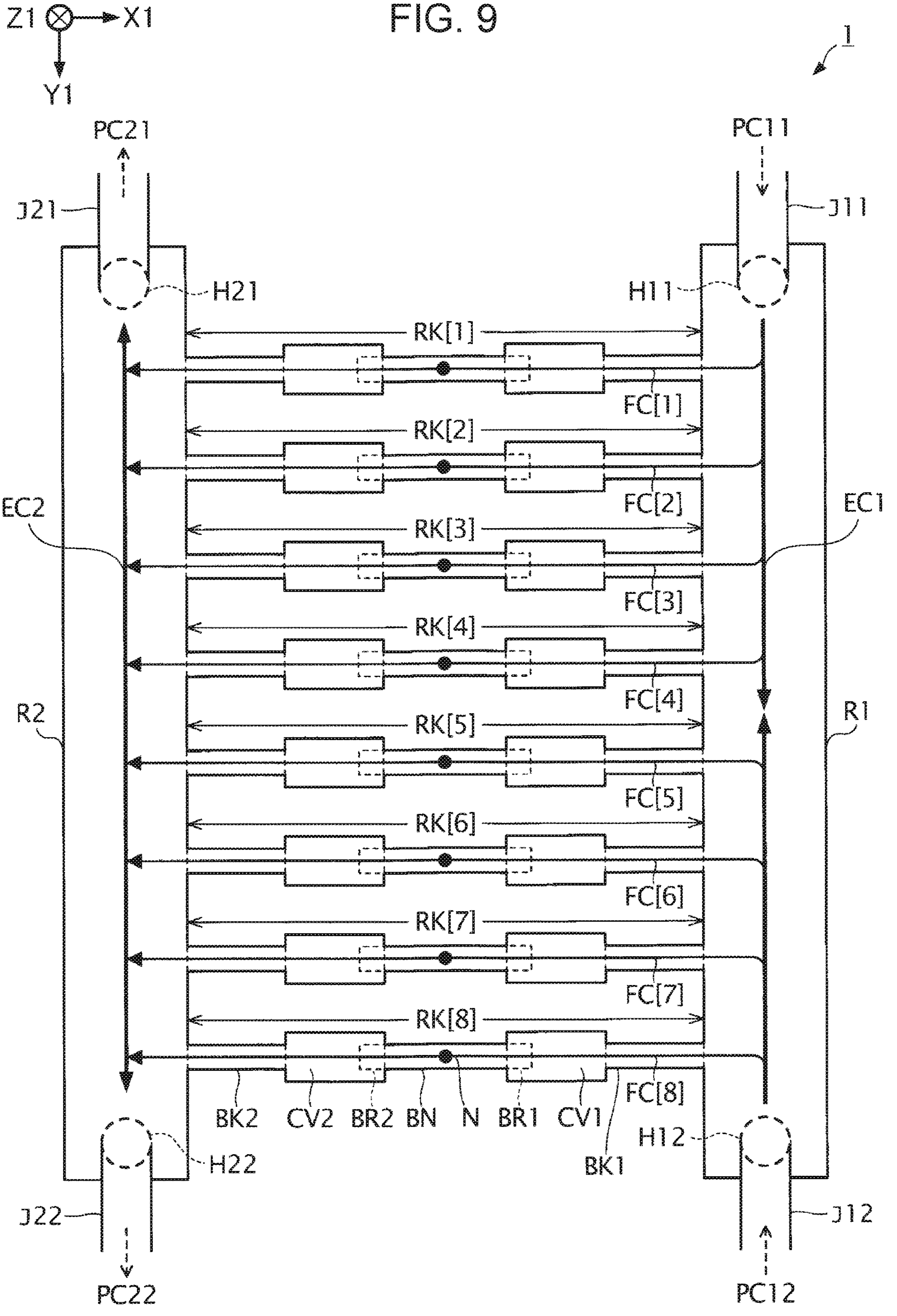
FIG. 9 illustrates an example of operation of the liquid discharging head in a print mode.

FIG. 9 illustrates operation of the liquid discharging head 1 in the print mode. Specifically, FIG. 9 illustrates flows of ink in the common flow path R and individual flow path RK when the liquid discharging head 1 is planarly viewed in the Z1 direction, as in FIG. 7.

As illustrated in FIGS. 6 and 9, the control device 7 controls the ink supply device 8 in the print mode so that: through the circulation flow path J11, ink is supplied to the common flow path R1; through the circulation flow path J12, ink is supplied to the common flow path R1; through the circulation flow path J21, ink is collected from the common flow path R2; and through the circulation flow path J22, ink is collected from the common flow path R2 (S21). In the print mode, therefore, ink in the common flow path R1 flows toward the individual flow path RK[m] as indicated by the arrow EC1; and ink in the common flow path R2 flows toward the circulation flow path J21 and circulation flow path J22 as indicated by the arrow EC2.

In the print mode in this embodiment, it will be assumed that the following relation holds among a supply amount PC11 by which ink is supplied from the circulation flow path J11 to the common flow path R1, a supply amount PC12 by which ink is supplied from the circulation flow path J12 to the common flow path R1, a collection amount PC21 by which ink is collected from the common flow path R2 through the circulation flow path J21, and a collection amount PC22 by which ink is collected from the common flow path R2 through the circulation flow path J22: PC11+PC12>PC21+PC22. In the individual flow path RK[m] in the print mode in this embodiment, ink flows from the common flow path R1 to the common flow path R2 in the X2 direction as indicated by the arrow FC[m]. Thus, ink is filled in the pressure chamber CV1 and pressure chamber CV2 included in the individual flow path RK[m].

In this embodiment, it will be assumed as an example that the following relation holds among the supply amount PA11, supply amount PB12, and supply amount PC11: PA11=PB12<PC11.

Referring again to FIG. 6, the control device 7 drives one or both of the piezoelectric element PZ1 and piezoelectric element PZ2 in the print mode to discharge, from the nozzle N, one or both of ink filled in the pressure chamber CV1 and ink filled in the pressure chamber CV2 (S22).

The control device 7 then controls the liquid discharging apparatus 100 so that the cap is attached to the nozzle surface NP (S31), as illustrated in FIG. 6.

Finally, the control device 7 decides whether a termination condition for the operation of the liquid discharging apparatus 100 has been satisfied (S32). An example of the termination condition may be that the liquid discharging apparatus 100 has been powered off.

When the decision result in step S32 is No, the control device 7 causes the process to proceed to step S11.

When the decision result in step S32 is Yes, the control device 7 terminates the series of processing illustrated in FIG. 6.

5. Conclusion in the Embodiment

As described above, the liquid discharging head 1 in this embodiment has: M individual flow paths RK corresponding to M nozzles N; a common flow path R1 communicating with one side of the M individual flow paths RK in common; a common flow path R2 communicating with another side of the M individual flow paths RK in common; a circulation flow path J11 communicating with the common flow path R1; a circulation flow path J12 communicating with the common flow path R1 at a position different from a position at which the circulation flow path J11 communicates with the common flow path R1; a circulation flow path J21 communicating with the common flow path R2; and a circulation flow path J22 communicating with the common flow path R2 at a position different from a position at which the circulation flow path J21 communicates with the common flow path R2. In an ink filling mode: through the circulation flow path J11, ink is supplied to the common flow path R1; through the circulation flow path J12, ink is collected from the common flow path R1; through the circulation flow path J21, ink is supplied to the common flow path R2; and through the circulation flow path J22, ink is collected from the common flow path R2. In this embodiment, the ink filling mode is an example of a first mode.

Thus, in this embodiment, it is possible to circulate, in the common flow path R1, ink from the circulation flow path J11 to the circulation flow path J12. In this embodiment, therefore, it is possible to restrain a bubble from staying in the common flow path R1, unlike so-called cavity circulation in which, for example, the common flow path R1 communicates with only the circulation flow path J11, the common flow path R2 communicates with only the circulation flow path J22, and ink supplied from the circulation flow path J11 to the common flow path R1 is collected from the circulation flow path J22 through the individual flow path RK and common flow path R2.

In the liquid discharging head 1 in this embodiment, the M individual flow paths RK are placed in the Y-axis direction; the circulation flow path J11 communicates with the common flow path R1 at the Y2-side end in the Y-axis direction, and the circulation flow path J12 communicates with the common flow path R1 at the Y1-side end in the Y-axis direction.

In this embodiment, therefore, it is possible to restrain a bubble from staying in the common flow path R1, unlike an aspect in which, for example, the circulation flow path J11 communicates with the common flow path R1 at a central portion in the Y-axis direction and the circulation flow path J12 communicates with the common flow path R1 at the central portion in the Y-axis direction.

In the liquid discharging head 1 in this embodiment, the circulation flow path J21 communicates with the common flow path R2 at the Y2-side end in the Y-axis direction, and the circulation flow path J22 communicates with the common flow path R2 at the Y1-side end in the Y-axis direction.

In this embodiment, therefore, it is possible to even amounts of ink flowing in the M individual flow paths RK[1] to RK[M] in the ink filling mode, unlike an aspect in which, for example, the circulation flow path J21 communicates with the common flow path R2 at the Y1-side end in the Y-axis direction and the circulation flow path J22 communicates with the common flow path R2 at the Y2-side end in the Y-axis direction. In this embodiment, this enables ink to be filled in the M individual flow paths RK[1] to RK[M] without any insufficiency or oversufficiency.

In the liquid discharging head 1 in this embodiment, the ink filling mode is an operation mode in which ink is filled in the liquid discharging head 1.

In the liquid discharging head 1 in this embodiment, the nozzle surface NP in which the M nozzles N are formed is sealed in the ink filling mode.

In this embodiment, therefore, it is possible to restrain ink in the liquid discharging head 1 from being dried in a period during which ink is filled in the liquid discharging head 1.

In a print mode in the liquid discharging head 1 in this embodiment: through the circulation flow path J11, ink is supplied to the common flow path R1; through the circulation flow path J12, ink is supplied to the common flow path R1; through the circulation flow path J21, ink is collected from the common flow path R2; and through the circulation flow path J22, ink is collected from the common flow path R2. In this embodiment, the print mode is an example of a second mode.

That is, in this embodiment, since, in the print mode, ink is supplied from the common flow path R1 to the individual flow path RK[m] and ink in the individual flow path RK[m] is collected from the common flow path R2, the difference between pressure to be applied to ink in the common flow path R1 and pressure to be applied to ink in the common flow path R2 can be made greater than in the ink filling mode. This enables ink to be efficiently supplied to the individual flow path RK[m].

In the liquid discharging head 1 in this embodiment, the print mode is an operation mode in which the liquid discharging head 1 discharges ink.

In the liquid discharging head 1 in this embodiment, the supply amount PA11 by which ink is supplied from the circulation flow path J11 to the common flow path R1 per unit time in the ink filling mode is smaller than the supply amount PC11 by which ink is supplied from the circulation flow path J11 to the common flow path R1 per unit time in the print mode.

In this embodiment, therefore, it is possible to make the amount of power consumption involved in driving the pump G11 smaller than when the supply amount PA11 from the circulation flow path J11 in the ink filling mode is greater than the supply amount PC11 from the circulation flow path J11 in the print mode.

In the liquid discharging head 1 in this embodiment, the supply amount PA11 by which ink is supplied from the circulation flow path J11 to the common flow path R1 per unit time in the ink filling mode is greater than the supply amount PA21 by which ink is supplied from the circulation flow path J21 to the common flow path R2 per unit time in ink filling mode.

In this embodiment, therefore, it is possible to fill ink in the individual flow path RK in the ink filling mode.

In a reversed filling mode in the liquid discharging head 1 in this embodiment, through the circulation flow path J11, ink is collected from the common flow path R1; through the circulation flow path J12, ink is supplied to the common flow path R1; through the circulation flow path J21, ink is collected from the common flow path R2; and through the circulation flow path J22, ink is supplied to the common flow path R2. In this embodiment, the reversed filling mode is an example of a third mode.

That is, in this embodiment, the direction of an ink flow in the common flow path R1 is reversed between the ink filling mode and the reversed filling mode, and the direction of an ink flow in the common flow path R2 is also reversed between the ink filling mode and the reversed filling mode. In this embodiment, therefore, it is possible to reduce the possibility that a bubble stays in the common flow path R1 or common flow path R2 when compared with, for example, an aspect in which ink in the common flow path R1 flows only in one direction and an aspect in which ink in the common flow path R2 flows only in one direction.

B. Variations

The embodiment exemplified above can be varied in various ways. Aspects of specific variations will be exemplified below. Any two or more aspects selected from the exemplary examples described below can be appropriately combined within a range in which any mutual contradiction does not occur.

Variation 1

In the embodiment described above, it has been exemplified that in the ink filling mode and reversed filling mode, a match is made between the ink flow direction in the common flow path R1 and the ink flow direction in the common flow path R2. However, the present disclosure is not limited to this type of aspect. In one or both of the ink filling mode and reversed filling mode, ink in the common flow path R1 and ink in the common flow path R2 may flow in mutually opposite directions.

Figure 10:
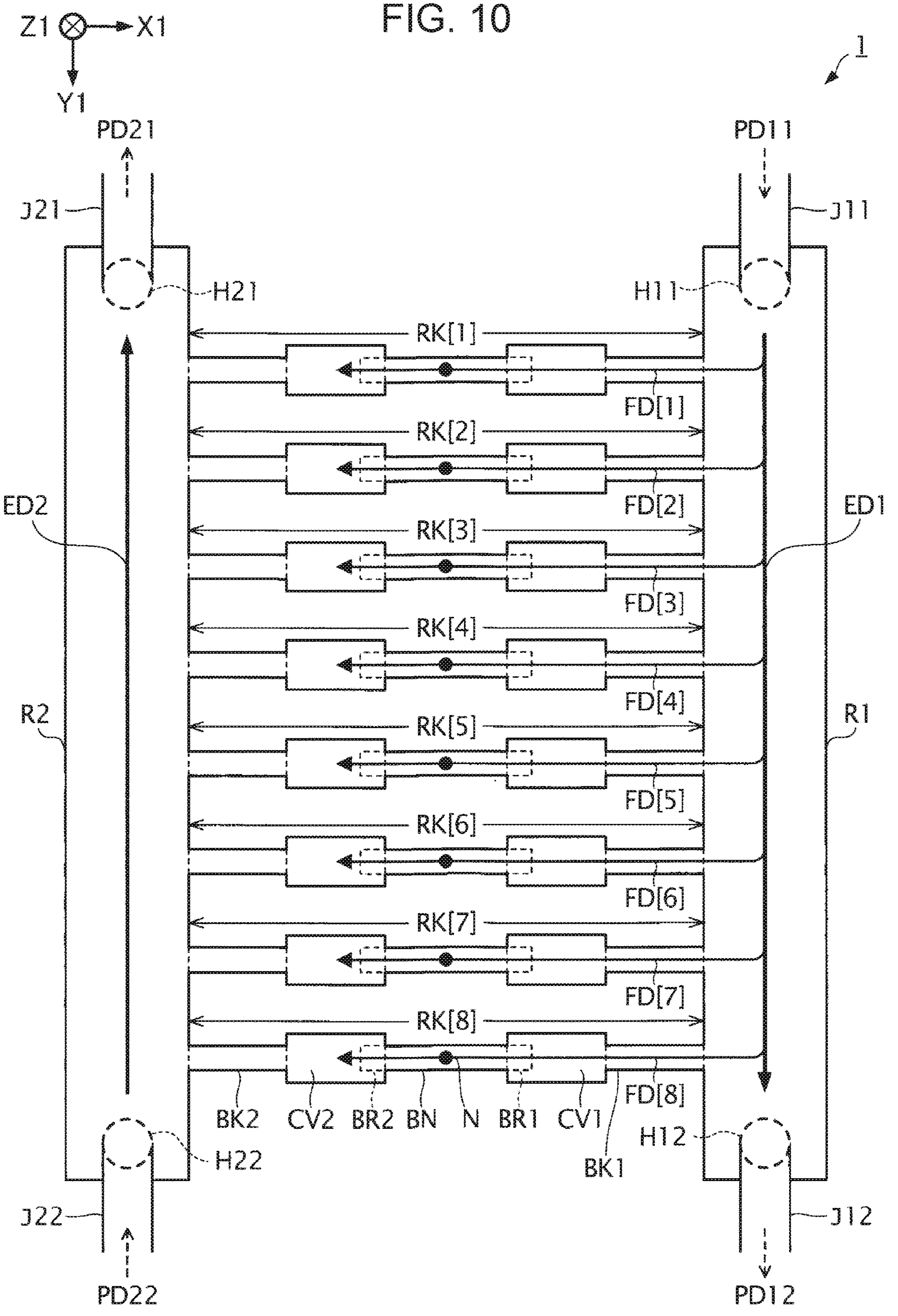
FIG. 10 illustrates an example of operation of the liquid discharging head in an ink filling mode in variation 1.

FIG. 10 illustrates operation of the liquid discharging head 1 in the ink filling mode in this variation. Specifically, FIG. 10 illustrates flows of ink in the common flow path R and individual flow path RK when the liquid discharging head 1 is planarly viewed in the Zz direction, as in FIG. 7.

In the ink filling mode in this variation: through the circulation flow path J11, ink is supplied to the common flow path R1; through the circulation flow path J12, ink is collected from the common flow path R1; through the circulation flow path J21, ink is collected from the common flow path R2; and through the circulation flow path J22, ink is supplied to the common flow path R2; as illustrated in FIG. 10. In the ink filling mode in this variation, therefore, ink flows in the common flow path R1 in the Y1 direction as indicated by the arrow ED1; and ink flows in the common flow path R2 in the Y2 direction as indicated by the arrow ED2.

In this variation, the circulation flow path J22 is an example of a third flow path, and the circulation flow path J21 is an example of a fourth flow path.

In the ink filling mode in this variation, it will be assumed that the following relation holds among a supply amount PD11 by which ink is supplied from the circulation flow path J11 to the common flow path R1, a supply amount PD12 by which ink is collected from the common flow path R1 through the circulation flow path J12, a supply amount PD22 by which ink is supplied from the circulation flow path J22 to the common flow path R2, and a supply amount PD21 by which ink is collected from the common flow path R2 through the circulation flow path J21: PD11−PD12>PD22−PD21. In the ink filling mode in this variation, therefore, ink in the individual flow path RK[m] flows from the common flow path R1 to the common flow path R2 in the X2 direction, as indicated by the arrow FD[m]. Thus, ink is filled in the pressure chamber CV1 and pressure chamber CV2 included in the individual flow path RK[m].

Thus, in the liquid discharging head 1 in this variation, the circulation flow path J22, through which ink is supplied to the common flow path R2, communicates with the common flow path R2 at the Y1-side end in the Y-axis direction; and the circulation flow path J21, through which ink is collected from the common flow path R2, communicates with the common flow path R2 at the Y2-side end in the Y-axis direction.

In this variation, therefore, it is possible to supply ink to, for example, the M individual flow paths RK[1] to RK[M] sequentially, starting from the individual flow paths RK[1] and terminating at the individual flow paths RK[M].

Variation 2

In the embodiment and variation 1 described above, it has been exemplified that the supply amount PA11 by which ink is supplied from the circulation flow path J11 to the common flow path R1 per unit time in the ink filling mode is smaller than the supply amount PC11 by which ink is supplied from the circulation flow path J11 to the common flow path R1 per unit time in the print mode. However, the present disclosure is not limited to this type of aspect. For example, the supply amount PA11 by which ink is supplied from the circulation flow path J11 to the common flow path R1 per unit time in the ink filling mode may be equal to the supply amount PC11 by which ink is supplied from the circulation flow path J11 to the common flow path R1 per unit time in the print mode.

Alternatively, for example, the supply amount PA11 by which ink is supplied from the circulation flow path J11 to the common flow path R1 per unit time in the ink filling mode may be greater than the supply amount PC11 by which ink is supplied from the circulation flow path J11 to the common flow path R1 per unit time in the print mode.

In this case, in the ink filling mode, a sufficient amount of ink is supplied to the common flow path R1, so a sufficient amount of ink can be supplied to the individual flow path RK, which has a higher flow path resistance than the common flow path R1, as well.

Variation 3

In the embodiment and variations 1 and 2 described above, it has been exemplified that the liquid discharging head 1 operates in three operation modes, ink filling mode, reversed filling mode, and print mode. However, the present disclosure is not limited to this type of aspect. It is only necessary that the liquid discharging head 1 can operate in at least two operation modes, ink filling mode and print mode.

Variation 4

In the embodiment and variations 1 to 3 described above, it has been exemplified that a single individual flow path RK includes two pressure chambers CV, CV1 and CV2. However, the present disclosure is not limited to this type of aspect. A single individual flow path RK may include only a single pressure chamber CV.

Variation 5

In the embodiment and variations 1 to 4 described above, the liquid discharging apparatus 100 has been exemplified that is a serial liquid discharging apparatus in which the storage case 921 with liquid discharging heads 1 mounted in it is bidirectionally moved in the X-axis direction. However, the present disclosure is not limited to this type of aspect. The liquid discharging apparatus 100 may be a line liquid discharging apparatus in which a plurality of nozzles N are provided across the width of the medium PP.

Variation 6

The liquid discharging apparatus 100 exemplified in the embodiment and variations 1 to 5 described above can be applied not only to devices specific to printing but also to various other devices including a facsimile machine and a copying machine. Of course, applications of the liquid discharging apparatus 100 of the present disclosure are not limited to printing. For example, when the liquid discharging apparatus 100 is a type that discharges a color material solution, the liquid discharging apparatus 100 is used as a manufacturing apparatus that forms color filters for liquid crystal display devices. In another example, when the liquid discharging apparatus 100 is a type that discharges a conductive material solution, the liquid discharging apparatus 100 is used as a manufacturing apparatus that forms wires and electrodes on wiring boards.

What is claimed is:

1. A liquid discharging head comprising:
- a plurality of individual flow paths corresponding to a plurality of nozzles;
- a first common flow path communicating with one side of the plurality of individual flow paths in common;
- a second common flow path communicating with another side of the plurality of individual flow paths in common;
- a first flow path communicating with the first common flow path;
- a second flow path communicating with the first common flow path at a position different from a position at which the first flow path communicates with the first common flow path;
- a third flow path communicating with the second common flow path; and
- a fourth flow path communicating with the second common flow path at a position different from a position at which the third flow path communicates with the second common flow path; wherein in a first mode
- through the first flow path, a liquid is supplied to the first common flow path,
- through the second flow path, the liquid is collected from the first common flow path,
- through the third flow path, the liquid is supplied to the second common flow path, and
- through the fourth flow path, the liquid is collected from the second common flow path.

2. The liquid discharging head according to claim 1, wherein
- the plurality of individual flow paths are placed in first direction;
- the first flow path communicates with the first common flow path at an end on one side in the first direction; and the second flow path communicates with the first common flow path at an end on another side in the first direction.

3. The liquid discharging head according to claim 2, wherein:

the third flow path communicates with the second common flow path at an end on the one side in the first direction; and the fourth flow path communicates with the second common flow path at an end on the another side in the first direction.

4. The liquid discharging head according to claim 2, wherein:

the third flow path communicates with the second common flow path at an end on the another side in the first direction; and the fourth flow path communicates with the second common flow path at an end on the one side in the first direction.

5. The liquid discharging head according to claim 1, wherein the liquid discharging head fills the liquid in the first mode.

6. The liquid discharging head according to claim 5, wherein a nozzle surface in which the plurality of nozzles are formed is sealed in the first mode.

7. The liquid discharging head according to claim 1, wherein in a second mode through the first flow path, the liquid is supplied to the first common flow path, through the second flow path, the liquid is supplied to the first common flow path, through the third flow path, the liquid is collected from the second common flow path, and through the fourth flow path, the liquid is collected from the second common flow path.

8. The liquid discharging head according to claim 7, wherein the liquid discharging head discharges the liquid in the second mode.

9. The liquid discharging head according to claim 7, wherein a supply amount by which the liquid is supplied from the first flow path to the first common flow path per unit time in the first mode is greater than the supply amount by which the liquid is supplied from the first flow path to the first common flow path per unit time in the second mode.

10. The liquid discharging head according to claim 7, wherein a supply amount by which the liquid is supplied from the first flow path to the first common flow path per unit time in the first mode is smaller than the supply amount by which the liquid is supplied from the first flow path to the first common flow path per unit time in the second mode.

11. The liquid discharging head according to claim 1, wherein a supply amount by which the liquid is supplied from the first flow path to the first common flow path per unit time in the first mode is greater than the supply amount by which the liquid is supplied from the third flow path to the second common flow path per unit time in the first mode.

12. The liquid discharging head according to claim 1, wherein in a third mode through the first flow path, the liquid is collected from the first common flow path, through the second flow path, the liquid is supplied to the first common flow path, through the third flow path, the liquid is collected from the second common flow path, and through the fourth flow path, the liquid is supplied to the second common flow path.

13. A liquid discharging apparatus comprising:

the liquid discharging head according to claim 1; and a control device that controls the liquid discharging head in the first mode.

* * * * *